United States Patent US 12,304,668 B2
Cox et al. Date of Patent: May 20, 2025

(54) SATELLITE CONSTELLATION SCHEDULING

(71) Applicant: Utah State University Space Dynamics Laboratory, North Logan, UT (US)

(72) Inventors: Skylar Cox, North Logan, UT (US); Justin Whitaker, Logan, UT (US); John Humble, Logan, UT (US); Greg Droge, Nibley, UT (US)

(*) Notice: Subject to any disclaimer, the term of this patent is extended or adjusted under 35 U.S.C. 154(b) by 277 days.

(21) Appl. No.: 17/933,602

(22) Filed: Sep. 20, 2022

(65) Prior Publication Data

US 2023/0166873 A1 Jun. 1, 2023

Related U.S. Application Data

(60) Provisional application No. 63/246,261, filed on Sep. 20, 2021.

(51) Int. Cl.
*B64G 3/00* (2006.01)
*B64G 1/10* (2006.01)
*G06F 9/48* (2006.01)

(52) U.S. Cl.
CPC .............. *B64G 3/00* (2013.01); *G06F 9/4881* (2013.01); *B64G 1/1007* (2013.01); *B64G 1/1021* (2013.01)

(58) Field of Classification Search
CPC ...... B64G 3/00; B64G 1/1007; B64G 1/1021; G06F 9/4881
See application file for complete search history.

(56) References Cited

U.S. PATENT DOCUMENTS

| | | | |
|---|---|---|---|
| 10,476,584 B1* | 11/2019 | Minelli | H04B 7/18519 |
| 10,762,458 B1* | 9/2020 | Augenstein | B64G 1/1021 |
| 2017/0105153 A1* | 4/2017 | Ashrafi | H04B 17/336 |
| 2019/0075485 A1* | 3/2019 | Xenakis | H04W 28/0289 |
| 2019/0238216 A1* | 8/2019 | Avellan | H04B 7/18534 |
| 2020/0277087 A1* | 9/2020 | Kaen | B64G 1/242 |

* cited by examiner

*Primary Examiner* — James M Mcpherson
*Assistant Examiner* — Clint Pham

(57) ABSTRACT

For generating a points-of-interest plan, a method generates communication graph nodes for at least one satellite. The method calculates communication graph edges from the communication graph nodes, wherein the communication graph nodes and the communication graph edges comprise a communication graph. The method solves the communication graph to yield a communication plan. The method generates a points-of-interest plan from the communication plan.

15 Claims, 15 Drawing Sheets

240

Communication Graph Edge
241

Communication Graph Edge
241

Communication Graph Edge
241

241

Target Time Window
233

Base Station Time Window
235

Edge Cost
243

Edge Score
245

Used Variable
247

SATELLITE CONSTELLATION SCHEDULING

CROSS-REFERENCE TO RELATED APPLICATIONS

This application claims priority to U.S. Provisional Patent Application 63/246,261 entitled "SATELLITE CONSTELLATION SCHEDULING" and filed on Sep. 20, 2021, for Skylar Cox, which is incorporated herein by reference.

GOVERNMENT SUPPORT

This invention was made with government support under contract number HQ0147-16-D-0002 awarded by the Missile Defense Agency. The government has certain rights in the invention.

FIELD

The subject matter disclosed herein relates to satellite constellation scheduling and more particularly relates to satellite constellation scheduling for imaging and communication.

BACKGROUND

Description of the Related Art

Constellations of satellites are scheduled to capture data and communicate the data to ground stations.

BRIEF SUMMARY

A method for generating a points-of-interest plan is disclosed.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
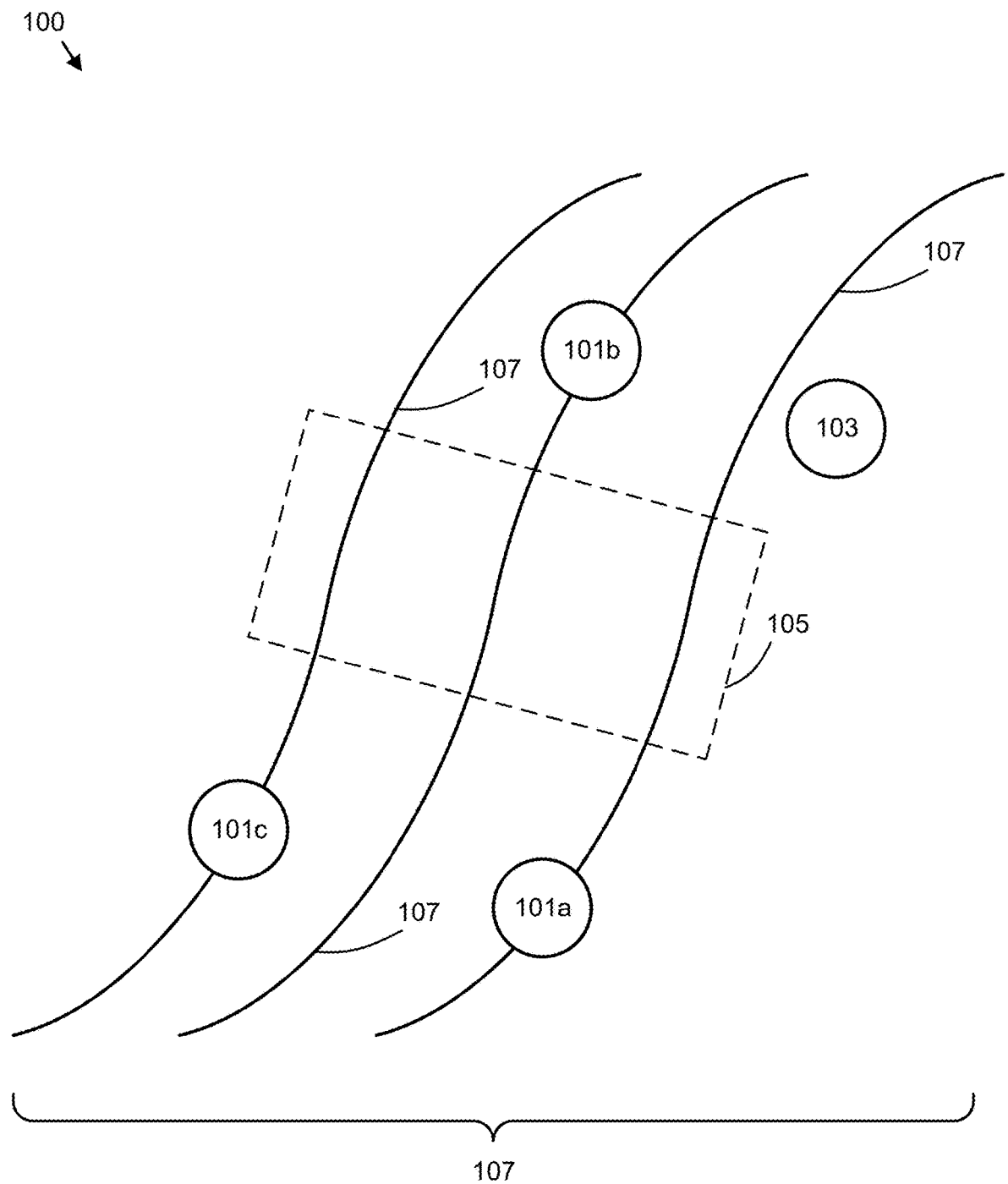
FIG. 1A is a schematic diagram illustrating one embodiment of a satellite constellation.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object-oriented programming language such as Python, Ruby, R, Java, Java Script, Smalltalk, C++, C sharp, Lisp, Clojure, PHP, or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

The description of elements in each figure may refer to elements of proceeding figures. Like numbers refer to like elements in all figures, including alternate embodiments of like elements.

FIG. 1A is a schematic diagram illustrating one embodiment of a satellite constellation 100. In the depicted embodiment, a plurality of satellites 101 are shown traversing orbital tracks 107. An orbital track 107 may pass over a target area 105. One or more satellites 101 may need to capture data in the target area 105. Capturing data may include but is not limited to capturing images, capturing sensor data, making measurements, communicating with instruments on the ground, communicating with other satellites 101 and the like. In addition, the satellites 101 may need to communicate with the ground station 103 in specified locations and/or at specified time intervals.

The embodiments described herein generate and solve a communication graph to yield a communication plan. In one embodiment, the communication plan is used to generate a points-of-interest plan. The points-of-interest plan may control the satellites 101 to capture data and communicate with the other satellites 101 and/or the ground station 103. As a result, the efficiency of a computer scheduling the satellites 101 is improved.

Figure 1B:
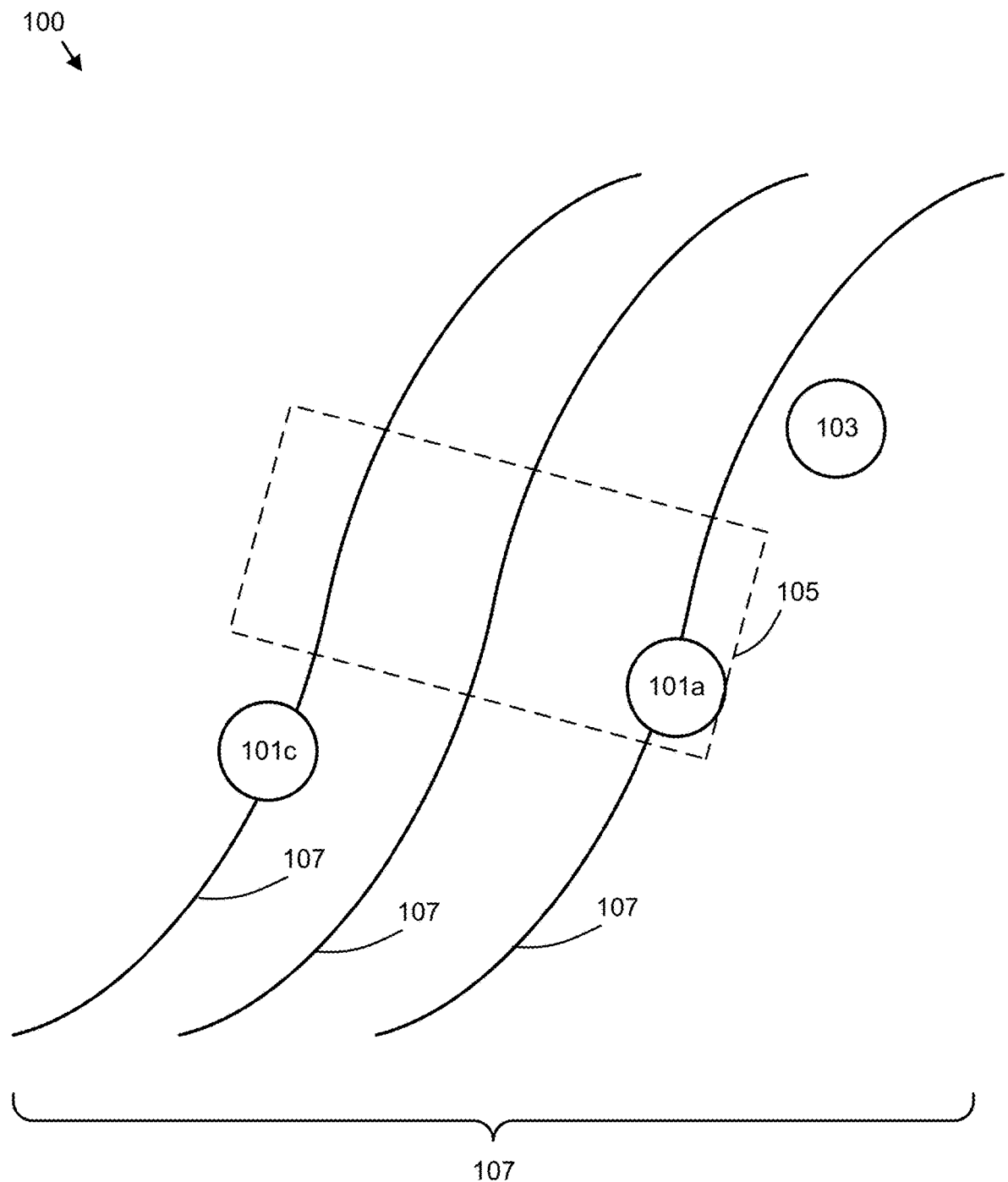
FIG. 1B is a schematic diagram illustrating one alternate embodiment of a satellite constellation.

FIG. 1B is a schematic diagram illustrating the satellite constellation 100 of FIG. 1A. In the depicted embodiment, a first satellite 101a is within the target area 105. The first satellite 101a may capture data within the target area 105.

Figure 1C:
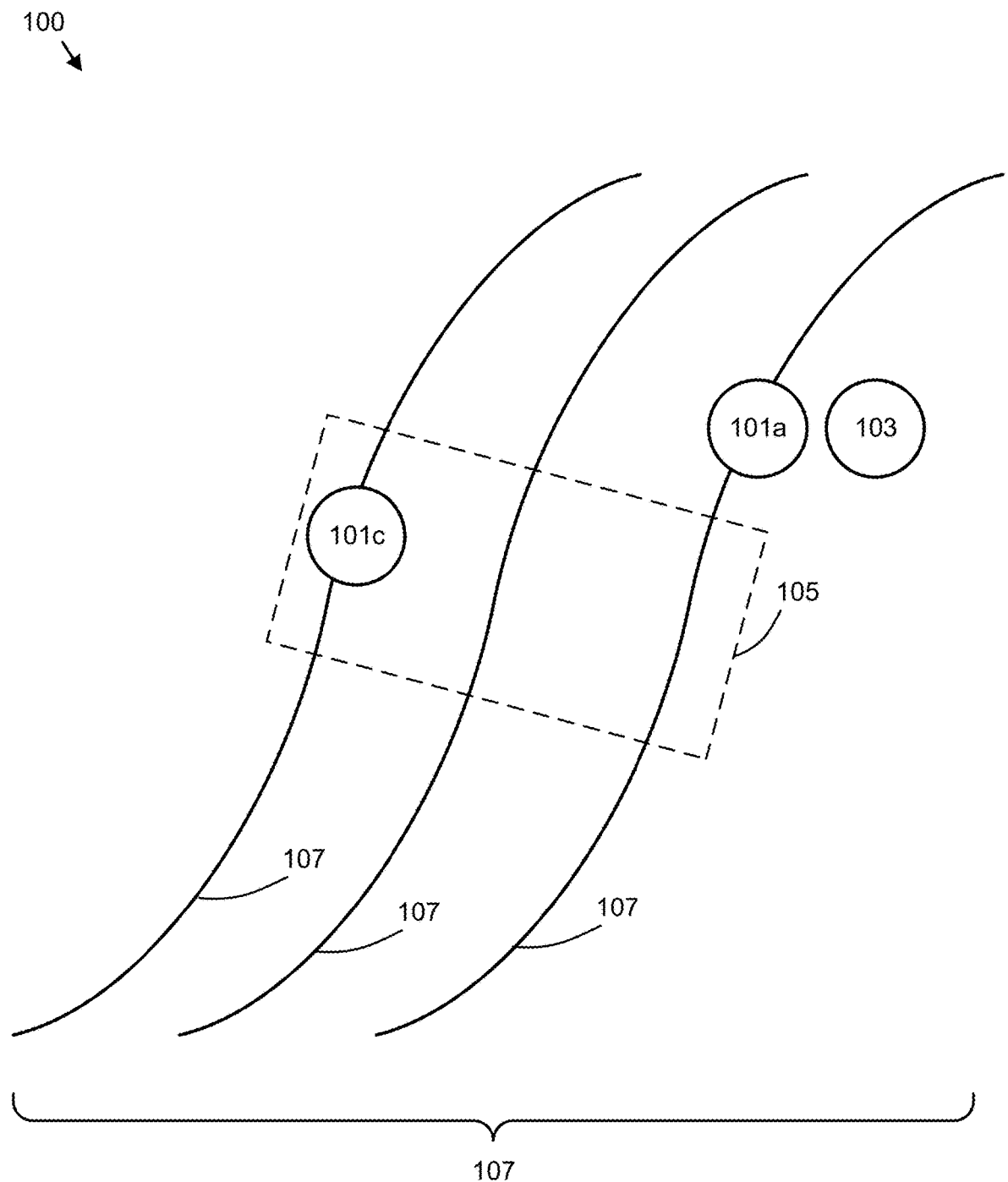
FIG. 1C is a schematic diagram illustrating one alternate embodiment of a satellite constellation.

FIG. 1C is a schematic diagram illustrating the satellite constellation 100 of FIGS. 1A-B. In the depicted embodiment, the first satellite 101a is in position to communicate with the ground station 103.

Figure 2A:
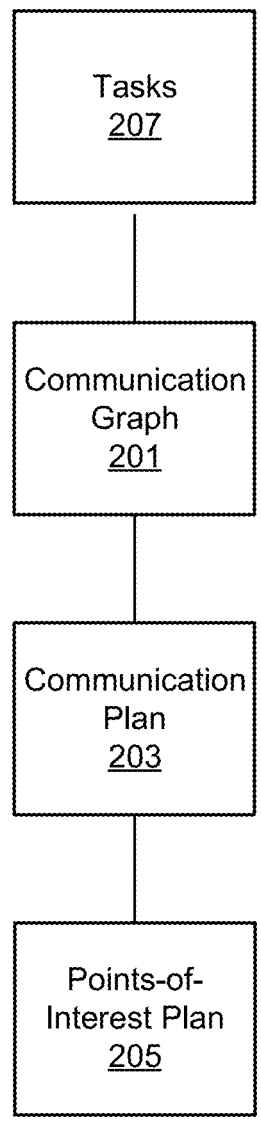
FIG. 2A is a schematic block diagram illustrating one embodiment of scheduling data.

FIG. 2A is a schematic block diagram illustrating one embodiment of scheduling data 200. The scheduling data 200 may be used to schedule the satellite constellation 100. The scheduling data 200 may be organized as a data structure in a memory. In the depicted embodiment, the scheduling data 200 includes tasks 207, a communication graph 201, the communication plan 203, and the points-of-interest plan 205. The tasks 207 may be used to generate the communication graph 201 as will be described hereafter. In one embodiment, the communication graph 201 is a directed acyclic graph (DAG). The communication graph 201 may be used to generate a communication plan 203. The communication plan 203 may be used to generate the points-of-interest plan 205.

Figure 2B:
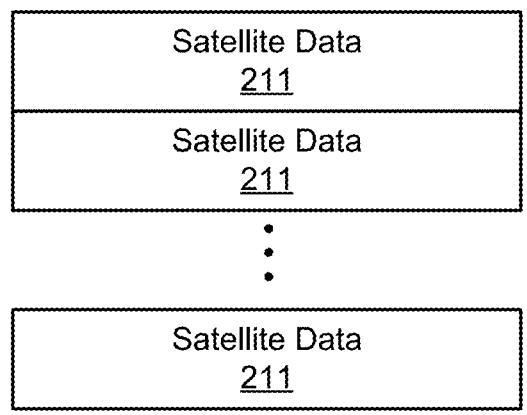
FIG. 2B is a schematic block diagram illustrating one embodiment of a constellation database.

FIG. 2B is a schematic block diagram illustrating one embodiment of a constellation database 210. The constellation database 201 may store satellite data 211 for each of the satellites 101 in the satellite constellation 100. The constellation database 201 may be organized as a data structure in a memory.

Figure 2C:
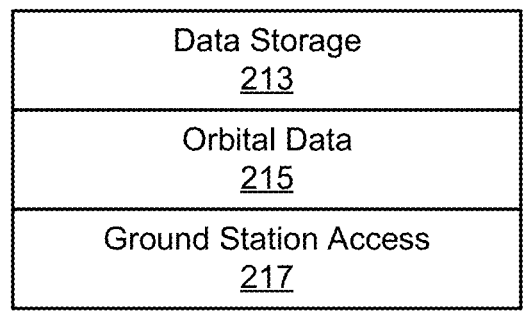
FIG. 2C is a schematic block diagram illustrating one embodiment of satellite data.

FIG. 2C is a schematic block diagram illustrating one embodiment of the satellite data 211 for a given satellite 101. In the depicted embodiment, the satellite data 211 includes data storage 213, orbital data 215, and ground station access 217. The data storage 213 may describe total and available data storage memory for the satellite 101. The orbital data 215 may describe orbital tracks 107 for the satellite 101. The ground station access 217 may describe when and/or where the satellite 101 may access the ground station 103.

Figure 2D:
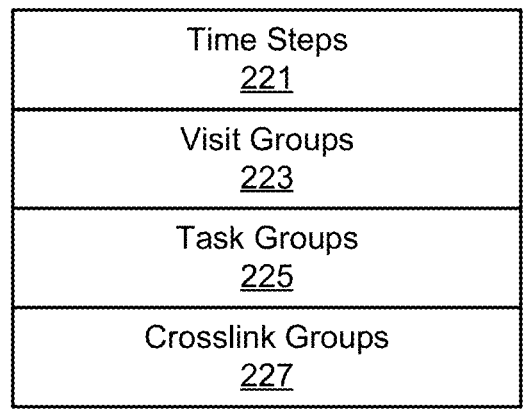
FIG. 2D is a schematic block diagram illustrating one embodiment of constellation data.

FIG. 2D is a schematic block diagram illustrating one embodiment of constellation data 220. The constellation data 220 may describe the organization of the satellite constellation 100. The constellation data 220 may be organized as a data structure in a memory. In the depicted embodiment, the constellation data 220 includes time steps 221, visit groups 223, task groups 225, and cross-link groups 227.

The time steps 221 may describe discrete scheduling time intervals. The cross-link groups 227 may describe satellites 101 that communicate between satellites 101. The task groups 225 may describe satellites 101 that are assigned one or more common tasks 207. Visit groups 223 may describe satellites 101 that interact.

Figure 2E:
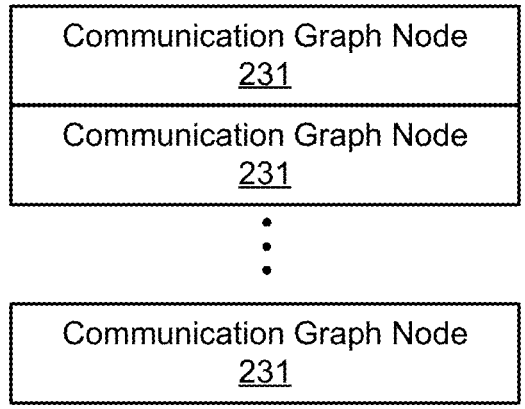
FIG. 2E is a schematic block diagram illustrating one embodiment of communication graph node data.

FIG. 2E is a schematic block diagram illustrating one embodiment of communication graph node data 230. The communication graph node data 230 includes a plurality of communication plan nodes 231 of the communication graph 201. The communication graph node data 230 may be organized as a data structure in a memory.

Figure 2F:
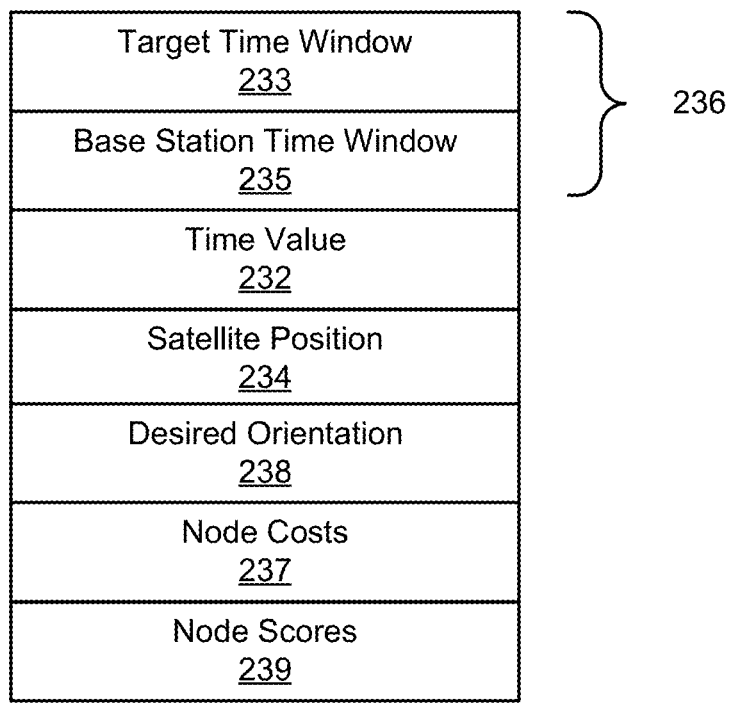
FIG. 2F is a schematic block diagram illustrating one embodiment of a communication graph node.

FIG. 2F is a schematic block diagram illustrating one embodiment of a communication graph node 231. In the depicted embodiment, the communication graph node 231 includes a target time window 233, a base station time window 235, a time value 232, a satellite position 234, a desired orientation 238, node costs 237, and node scores 239. The target time window 233 may describe a time interval that the satellite 101 is within the target area 105. The time value 232 may specify a discrete time and/or discrete time interval.

The satellite position 234 may specify the position in the orbital track 107 of the satellite 101. The desired orientation 238 may specify an orientation of the satellite 101 for capturing data and/or collecting solar energy. The base station time window 235 may describe a time interval during which the satellite 101 may communicate with the base station 103. The target time window 233 and base station time window 235 may be referred to as access windows 236. The node costs 237 may describe costs associated with the communication graph node 231. The node scores 239 may describe benefits associated with the communication graph node 231.

Figures 2G, 2H:
FIG. 2G is a schematic block diagram illustrating one embodiment of communication graph edge data.
FIG. 2H is a schematic block diagram illustrating one embodiment of a communication graph edge.

FIG. 2G is a schematic block diagram illustrating one embodiment of communication graph edge data 240. The communication graph edge data 240 includes a plurality of communication graph edges 241 of the communication graph 201. The communication graph edge data 240 may be organized as a data structure in a memory.

FIG. 2H is a schematic block diagram illustrating one embodiment of a communication graph edge 241. In the depicted embodiment, the communication graph edge 241 includes a target time window 233, a base station time window 235, an edge cost 243, an edge score 245, and a used variable 247. The edge cost 243 may include node costs 237 and other costs. The edge score 245 may include node scores 239 and other scores. The used variable 247 indicates if the communication graph edge 241 is used in a solution.

Figure 2I:
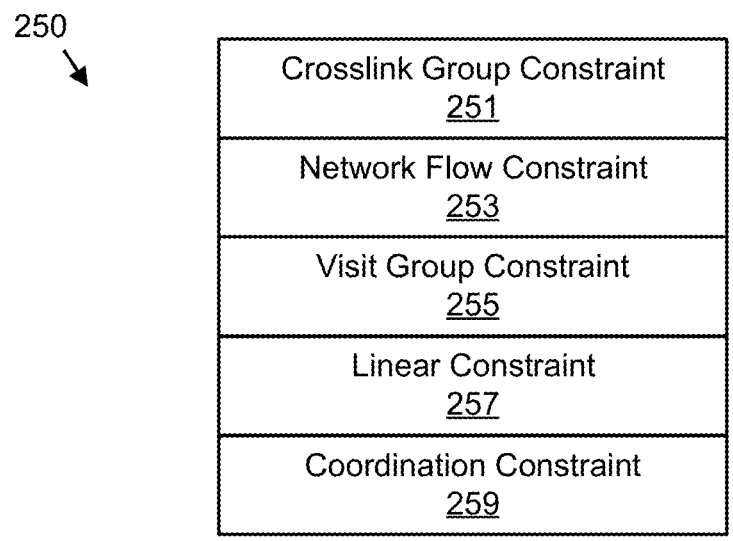
FIG. 2I is a schematic block diagram illustrating one embodiment of solution constraints.

FIG. 2I is a schematic block diagram illustrating one embodiment of solution constraints 250. The solution constraints 250 may be applied to the communication graph 201. The solution constraints 250 may be organized as a data structure in a memory. In the depicted embodiment, the solution constraints 250 include a cross-link group constraint 251, a network flow constraint 253, a visit group constraint 255, a linear constraint 257, and a coordination constraint 259.

The embodiments include single-layer approach for graph creation and MILP formulation. The first steps correspond to creating a communication graph 201 such as a DAG communication graph 201 over which the optimization is performed. The embodiments may begin by computing the access windows 236 of satellites 101 of the constellation 100 to access targets areas 105 and ground stations 103. These access windows 236 comprise temporal and spatial constraints. The temporal constraints define time windows in which a task 207 should be completed. The spatial constraints consider restrictions on the elevation angle between a target in the target area 105 and the satellite 101 for image quality, restriction on the azimuth angle to avoid obstructions, as well as lighting constraints (expressed as sun-elevation angle constraints). Given the satellite trajectory and assuming no orbital changes are considered by the planner, the spatial constraints are mapped to additional temporal constraints, combined to provide time windows in which each satellite may access each target.

Figure 3A:
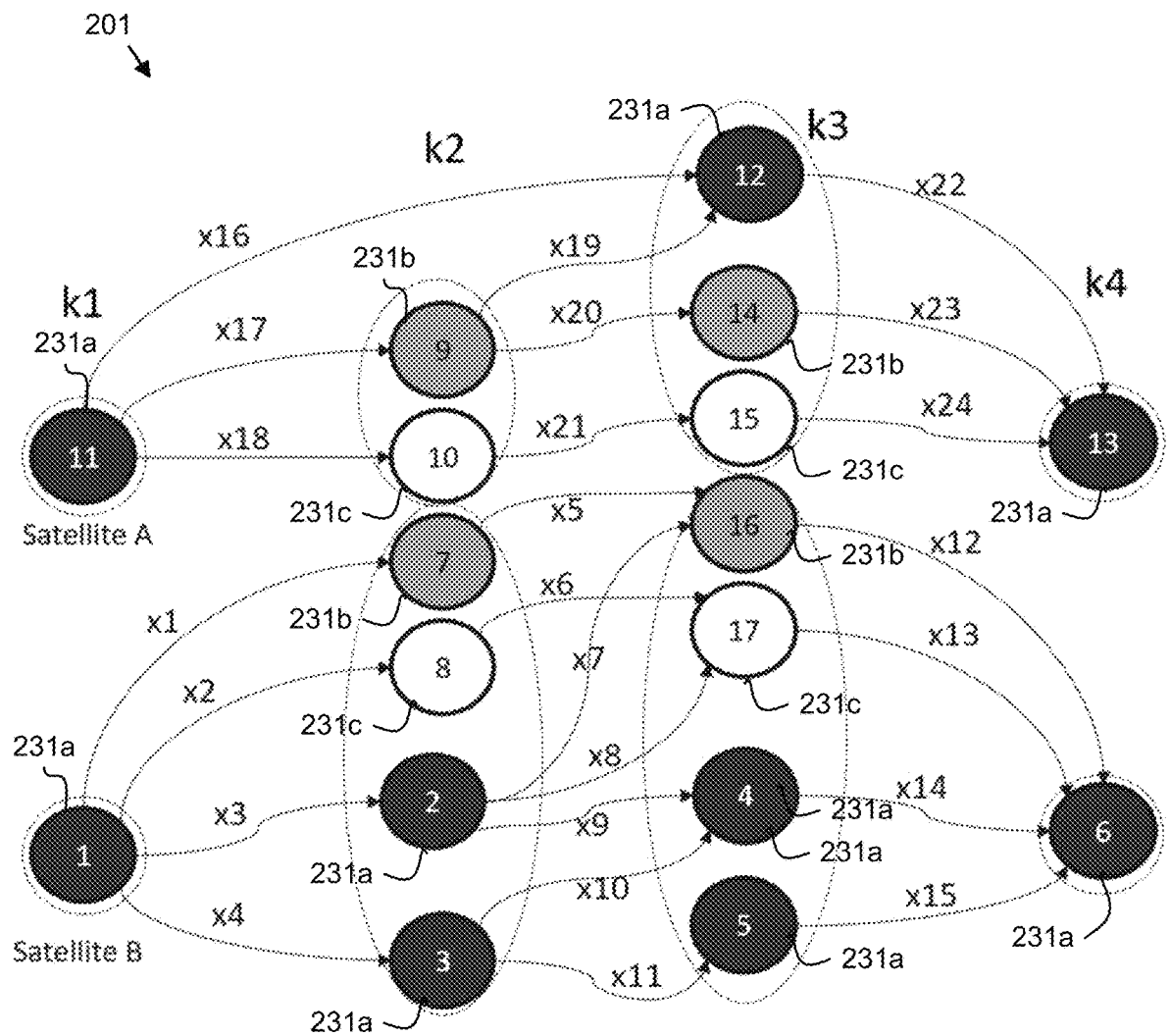
FIG. 3A is a graph illustrating one phase of an embodiment of a communication graph.

The embodiments may formulate the communication graph 201 directly from the access windows 236 as shown in FIG. 3A. The access windows 236 are discretized, providing discrete points in time for which a particular satellite 101 may access each target area 105. Communication graph nodes 231 in the communication graph 201 are formed from these discrete points in time as well as the starting and ending position of the satellites 101. Additional communication graph nodes 231, referred to as "backbone" nodes, are also added to ensure connectivity of the communication graph 201 as will be described hereafter. The communication graph nodes 231 (or vertices) are numbered from 1 to $n_v$ with communication graph node i 231 denoted as $v_i$. The set of all communication graph nodes 231 is defined as V.

Associated with each communication graph node 231 is the time value 232, the satellite position 234, and the desired orientation 238 of the satellite 101. Table 1 describes notation used for planning.

TABLE 1

| Name | Description | Name | Description |
|---|---|---|---|
| Counting variables | | | |
| $n_s$ | Number of satellites | $n_v$ | Number of nodes/vertices |
| $n_e$ | Number of edges | $n_g$ | Number of task groups |
| $n_t$ | Number of time steps | $n_{g\text{-}cl}$ | Number of crosslink groups |
| $n_{g\text{-}v}$ | Number of visit groups | | |
| Graph Representation | | | |
| V | Set of nodes or vertices | $V_i$ | Node i, $v_i \in V$ |
| E | Set of edges, $E \subset V \times V$ | $e_i$ | Edge i, $e_i \in E$ |
| G | Graph, {V, E} | | |
| Variables of optimization | | | |
| $x_i$ | Integer variable representing flow along edge $e_i$ | x | Vector of all $x_i$, x = $[X_1 \ldots X_{n_e}]$ |
| $y_{lk}$ | Memory for satellite l at time k | $y_{l,max}$ | The maximum memory capacity of satellite l |
| y | Vector of all $y_i$, y = $[y^T_1, \ldots, y^T_{n_s}]^T$ | z | All optimization parameters, z = $[x^T\ y^T]^T$ |
| Utility and scoring parameters | | | |
| $u_i$ | Utility associated with optimization variable i | u | Vector of all $u_i$ |
| Flow constraint parameters | | | |
| D | Incidence matrix | b | RHS of flow constraint with one source, one sink, and unit flow |
| Group constraint parameters | | | |
| $A_g$ | Group constraint matrix | $b_g$ | Group constraint RHS |
| Memory constraint parameters | | | |
| $A_{data}$ | Aggregate data constraint matrix | $b_{data}$ | Aggregate RHS vector for the data constraint |
| Crosslink group constraint parameters | | | |
| $J^{g\text{-}cl}_{i,d}$ | Index set of edges entering crosslink receive group i | $J^{g\text{-}cl}_{i,u}$ | Index set of edges entering crosslink send group i |
| $A^{g\text{-}cl}_{node}$ | Crosslink group constraint matrix using the node formulation | $A^{g\text{-}cl}_{edge}$ | Crosslink group constraint matrix using the edge formulation |
| $A^{g\text{-}cl}$ | One $A^{g\text{-}cl}_{node}$ or $A^{g\text{-}cl}_{edge}$ | | |
| Visit group constraint parameters | | | |
| $J^{g\text{-}v}_i$ | Index set of edges entering visit group i | $n^v_i$ | The maximum number of visits allowed to group i |
| $n_v$ | Vector of all $n^v_i \cdot n_v$ = $[n^v_1 \ldots n^v_{n_{g\text{-}v}}]^T$ | $A^{g\text{-}v}$ | Visit group constraint matrix |
| Indices and index mappings | | | |
| i, j | General indices into matrices and sets | l | Satellite index |
| k | Discrete time index | | |
| Two-layer variables | | | |
| $x_i$ | Binary variable on whether or not to select node i | $y_i$ | Amount of data on board (not a notion of agent) |
| $d_i$ | Penalty on data at node i | α | Weighting on data |

TABLE 1-continued

| Name | Description | Name | Description |
|---|---|---|---|
| $S_{dl}$ | Set of nodes corresponding to a downlink | $\bar{C}_i$ | Heuristic for the opportunity cost associated with downlink node i |
| $\bar{\alpha}_i$ | Heuristic sum of possible data downlinked and the possible data obtained | $\bar{b}_i$ | Heuristic for the amount of data that could be obtained if node i not chosen |

Once communication graph nodes 231 are established, the embodiments determine whether feasible transitions (e.g., satellite slews) exist between communication graph nodes 231. If it is feasible for a satellite 101 to transition between two communication graph nodes 231, those communication graph nodes 231 are connected with a communication graph edge 241. Similar to the communication graph nodes 231, the communication graph edges 241 are enumerated from 1 to $n_e$ with a given communication graph edge 241 denoted as $e_1$. The set of all communication graph edges 241 is denoted as E.

Once the communication graph nodes 231 and communication graph edges 241 have been determined, the node score 239 is assigned to each communication graph node 231 based on the value of performing the task 107, such as the value of image collection. The node score 239 is then assigned to the communication graph edge 241 that connects to that communication graph node 231. The edge score 243 is also assigned to each communication graph edge 241 that represents a downlink operation to a ground station 103. Conversely, an edge cost 243 is assessed to the transition between communication graph nodes 231 based upon the slew that must be performed. The edge score 245 and edge cost 243 of each communication graph edge 241 is combined into a utility denoted as $u_i$. As the embodiments define an edge preference, an optimization problem can be formulated to choose which communication graph edges 241 to take in an effort to maximize overall utility.

Network Flow MILP Formulation

From the communication graph 201, a mixed integer linear programming (MILP) problem can be defined. Several constraints are considered. The network flow constraint 253 is created to ensure that the chosen path moves naturally from one communication graph node 231 to another communication graph node 231 along communication graph edges 241 of the communication graph 201. As each point of interest (POI) may be represented in a number of different communication graph nodes 231, the coordination constraint 259 is added on groups of communication graph nodes 231 to ensure that each POI is imaged only once by the constellation 100. Finally, the linear constraint 257 is developed to represent the data levels onboard each satellite 101.

The variables of optimization include a binary used variable 247 for each communication graph edge, $x_i$ 231, denoting whether or not the solution uses communication graph edge i 241. The vector x combines all $x_i$ values. The optimization variables also include the data onboard each satellite for each time. The data for satellite 1 101 at time k is denoted as $y_{l,k}$ with the aggregate vector of all data values represented as y. The MILP formulation can be described by Equation 1, $$\max_z u^T z \quad \text{Equation 1}$$
$$\text{s.t.} \quad Dx = b \text{ (Flow)}$$
$$A_g x \leq 1_{n_g} \text{ (Coordination)}$$
$$A_{data} z = b_{data} \text{ (Data)}$$
$$x_i \in \{0, 1\} \forall i$$
$$0 \leq y_{l,k} \leq y_{l,max} \forall l,k$$
$$z = [x^T y^T]^T$$

Incorporating Crosslinks

A solution to the MILP problem in Equation 1 provides a balance between data gathering and data downlinking, with the satellites 101 having a limit to the amount of data that is allowed to stay onboard. However, it is often the case that a satellite 101 will not have direct communication with a ground station 103 for some time after the data has been collected. Thus, to facilitate the downlinking of data, a crosslink capability between satellites 101 is provided. This allows one satellite 101 to communicate its onboard data to another satellite 101, which can then subsequently communicate the data to a ground station 103. The embodiments provide the crosslink formulation as illustrated by an example.

Crosslink Formulation

Crosslink operations require two satellites 101 to perform a single crosslink task 207 since both satellites 101 must have their respective crosslink antennas pointed at each other at the same time during the crosslink operation. A potential crosslink is represented in the communication graph 201 through a combination of four communication graph nodes 231, two for each satellite 101 in the crosslink. Each of the two satellites 101 will have the ability to upload to or download from the other satellites 101. While there are four communication graph nodes 231, the communication graph nodes 231 must form part of the chosen path in one of two combinations. If an upload communication graph node 231 is selected from one satellite 101, then the corresponding downlink communication graph node 231 for the other constellation 100 must be chosen and visa versa. Additionally, the upload and download communication graph nodes 231 of a single satellite 101 cannot be simultaneously chosen. There is no need to add a constraint for the latter condition as both nodes 231 occur at the same point in time and the flow constraint will naturally disallow both nodes 231 being chosen as part of the path.

Consider the two graphs shown in FIG. 3A. The dark nodes 231a represent imaging tasks, while the light nodes 231c and medium nodes 231b represent transmit and receive crosslink tasks, respectively. Time steps are shown as groups from k1 to k4. The dynamic memory variables for this graph are represented in Table 2. Notice that the medium nodes 231b increase the memory on a satellite 101 since it will receive the data from its neighbor while the light nodes 231c are associated with a negative memory amount since the satellite 101 will send the data to its neighbor. This allows the memory to be properly accounted for across the constellation 100. Table 2 lists exemplary memory for FIG. 3A.

TABLE 2

| Node # | Memory (GB) |
|---|---|
| 1 | Initial B |
| 2 | 10 |
| 3 | 10 |

TABLE 2-continued

| Node # | Memory (GB) |
|---|---|
| 4 | 10 |
| 5 | 20 |
| 6 | 0 |
| 7 | 30 |
| 8 | −50 |
| 9 | 50 |
| 10 | −50 |
| 11 | Initial A |
| 12 | 10 |
| 13 | 0 |
| 14 | 50 |
| 15 | −50 |
| 16 | 50 |
| 17 | −50 |

Two exemplary crosslink formalizations are now presented. The first is a node-based approach mapped to an edge constraint. The second is a natural edge constraint.

Node-Based Crosslink Constraint Formulation

One way to express the crosslink group constraint 251 is to equate the number of communication graph edges 241 entering one satellite's uplink communication graph node 231 to the corresponding number of communication graph edges 241 entering the other satellite's downlink communication graph node 231. A pair of communication graph nodes 231 that must be selected may be referred to as a crosslink group 227 where each crosslink group 227 consists of exactly two communication graph nodes 231. Given $n_{g\text{-}cl}$ crosslink groups 227, there will be a total of $2n_{g\text{-}cl}$ crosslink communication graph nodes 231. Index sets corresponding to communication graph edges 241 entering the communication graph nodes 231 can be defined as $\mathcal{J}_{i,d}^{g\text{-}cl}$: Edge indices entering a group i downlink node $\mathcal{J}_{i,u}^{g\text{-}cl}$: Edge indices entering a group i uplink node The index sets can be incorporated into a constraint matrix as $$A_{node}^{g\text{-}cl} = [a_{i,j}^{g\text{-}cl}] = \begin{cases} 1 & j \in \mathcal{J}_{i,d}^{g\text{-}cl} \\ -1 & j \in \mathcal{J}_{i,u}^{g\text{-}cl} \\ 0 & \text{otherwise} \end{cases},$$

with the crosslink constraint expressed as $A_{node}^{g\text{-}cl}x=0$.

Edge-Based Crosslink Constraint Formulation

The node-based crosslink constraint formulation combined with the network flow constraint 253 will ensure that paths only include the allowed communication path node combinations. A simplification can actually occur if the embodiments acknowledge a physical restraint of the system: data exchange occurs along the communication graph edges 241 and not the communication graph nodes 231. In other words, crosslinking of data will not happen when the correct communication path nodes 231 are traversed, rather, crosslink will occur if one satellite 101 has subsequent uplink communication graph nodes 231 connected by an edge and the other satellite has subsequent downlink communication graph nodes 231 connected by a communication graph edge 241 at the same time.

This principle allows the balancing of incoming communication graph edges 241 to be ignored, increasing computational efficiency of a computer. In fact, a chosen path may pass through a crosslink communication graph node 231 without the corresponding opposite communication graph node 231 for the other satellite 101 being chosen as long as the chosen path does not pass between subsequent crosslink communication path nodes 231. Instead of forming the $n_{g\text{-}cl}$ crosslink groups 227 as communication graph node pairs, the crosslink groups 227 are now formed as communication graph edge pairs, i.e., an communication graph edge 241 between subsequent downlink communication graph nodes 231 and a communication graph edge 241 between uplink communication graph nodes 231 at the same time. The constraint matrix can now be formulated as:

$$A_{edge}^{g\text{-}cl} = [a_{ij}^{g\text{-}cl}] = \begin{cases} 1 & \text{Edge } j \text{ is downlink for group } i \\ -1 & \text{Edge } j \text{ is uplink for group } i \\ 0 & \text{otherwise} \end{cases},$$

with the constraint written as $A_{edge}^{g\text{-}cl}x=0$.

Allowing $A^{g\text{-}cl}$ to equal either $A_{edge}^{g\text{-}cl}$, the MILP problem including crosslink can be written as Equation 2.

$$\begin{aligned} \max_z \quad & u^T z & \text{Equation 2}\\ \text{s.t.} \quad & Dx = b \text{ (Flow)} \\ & A_g x \le 1_{n_g} \text{ (Coordination)} \\ & A_{data} z = b_{data} \text{ (Data)} \\ & A^{g\text{-}cl} x = 0 \text{ (Crosslink)} \\ & x_i \in \{0, 1\} \forall i \\ & 0 \le y_{l,k} \le y_{l,max} \forall l,k \\ & z = [x^T \, y^T]^T \end{aligned}$$

Simple Crosslink Example

Figure 3B:
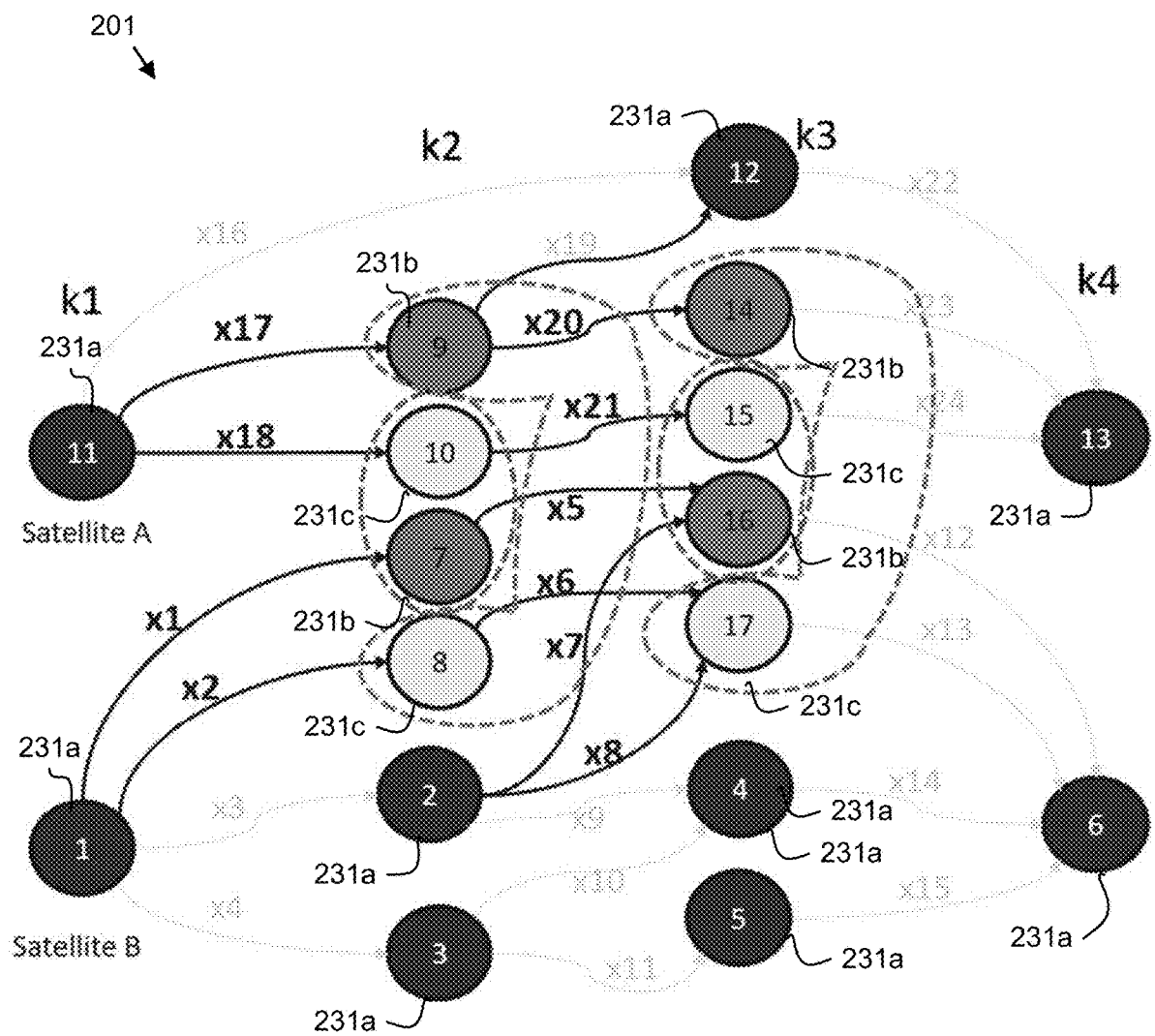
FIG. 3B is a graph illustrating one phase of an embodiment of a communication graph.

A simple example is now provided to illustrate the concept using the communication graph 201 in FIG. 3A. The crosslink group constraint 251 may be applied to ensure both the transmit and receive operations occur together. For example, FIG. 3B illustrates the required crosslink groupings 227 between the communication graphs 201. For the crosslink groups 227 at time step k2m node 10 and node 7 are grouped as well as nodes 8 and 9. Similarly, at time step k3, nodes 15 and 16 are together as well as nodes 14 and 17. This ensures that the transmit and receive pairings occur together appropriately.

Using the node-based formulation, the crosslink group constraint 251 is defined as $$\begin{bmatrix} x_{17} - x_2 \\ x_{18} - x_1 \\ x_{20} - x_6 - x_8 \\ x_{21} - x_5 - x_7 \end{bmatrix} = \begin{bmatrix} 0 \\ 0 \\ 0 \\ 0 \end{bmatrix}$$

These equations are mapped to matrix form as shown in Table 3, a matrix form of crosslink constraint equations.

TABLE 3

| Xlink | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| | | | | | | | | | | | | | Edge | | | | | | | | | | | |
| Nodes 8/9 | 0 | -1 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| Nodes 7/10 | -1 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| Nodes 14/17 | 0 | 0 | 0 | 0 | 0 | -1 | 0 | -1 | 0 | 0 | 0 | 0 | 0 | 0 | 0 | 0 | 0 | 0 | 0 | 1 | 0 | 0 | 0 | 0 |
| Nodes 15/16 | 0 | 0 | 0 | 0 | -1 | 0 | -1 | 0 | 0 | 0 | 0 | 0 | 0 | 0 | 0 | 0 | 0 | 0 | 0 | 0 | 1 | 0 | 0 | 0 |

The communication graphs 201 are set up to allow for either imaging or crosslink operations. Note that the initial memory values assigned to each satellite 101 will have a direct impact on the paths chosen by the optimization routine. Two examples are now provided to prove the concept.

Memory Space Available

Figure 3C:
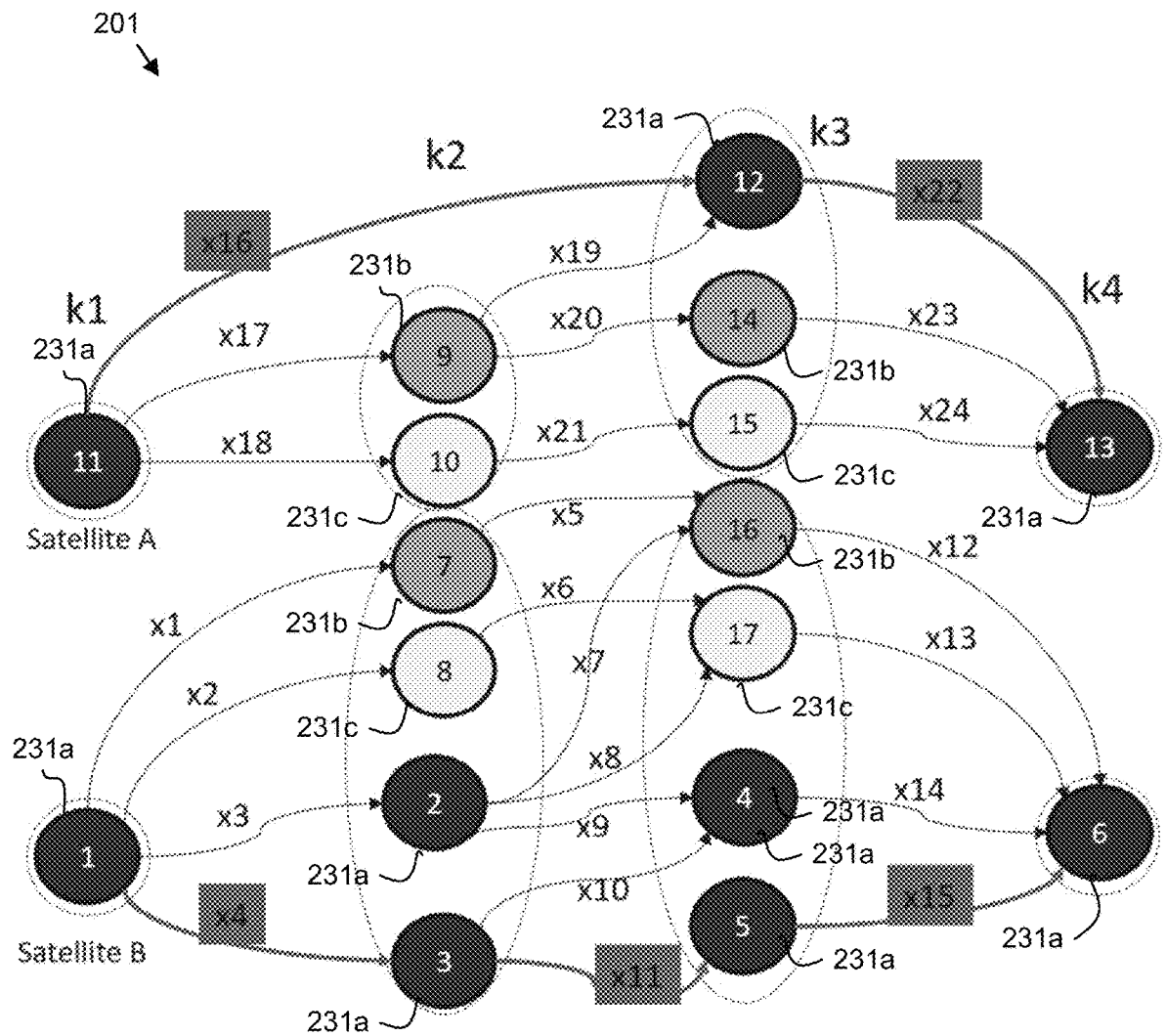
FIG. 3C is a graph illustrating one phase of an embodiment of a communication graph.

For our initial demonstration, consider the scenario where both satellite A 101 and satellite B 101 start the mission planning process with a completely empty onboard storage device that is capable of storing up to 200 GB. No memory is consumed yet when starting from the initial graph node 1, and imaging opportunities are available for fulfillment as illustrated in FIG. 3A. Solving the optimal path through the communication graph 201 results in the path highlighted in green in FIG. 3C. The corresponding stored data amounts, at each time step, are shown in Table 4. Note that the satellite operations match the selected path and never approach the limit of 200 GB.

Table 4 shows results of the on-board memory status at each time step for satellites A and B.

TABLE 4

| Time Step | Sat A Memory | Sat B Memory |
|---|---|---|
| k1 | 0 GB | 0 GB |
| k2 | 0 GB | 10 GB |
| k3 | 10 GB | 30 GB |
| k4 | 10 GB | 30 GB |

Figure 3D:
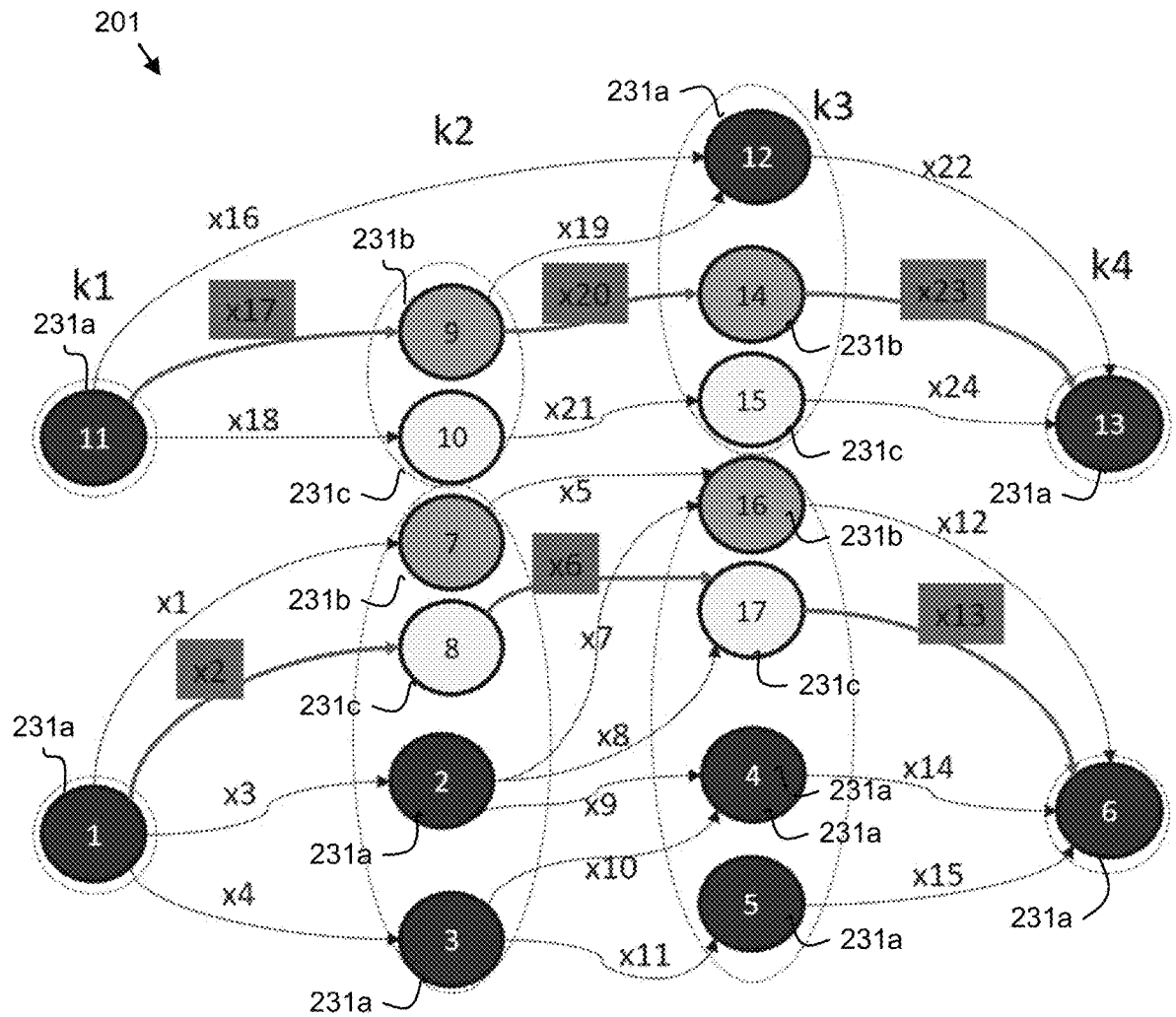
FIG. 3D is a graph illustrating one phase of an embodiment of a communication graph.

In an alternate example, the communication graph 201 is still the same as FIG. 3A, but the onboard data recorder is initially at 80 GB on satellite A 101 and 200 GB on satellite B 101. With these initial conditions, satellite B 101 is unable to follow the same route from the previous example due to the data storage constraints. To alleviate the situation, satellite B 101 must transmit data to satellite A 101, and satellite A 101 must receive the data. This result is illustrated by solving the linear program and finding the path solution shown in FIGS. 3D-E. The corresponding data storage at each time step is shown in Table 5. Note that the data constraint is respected, and that both satellites 101 cooperate to ensure that the memory limits are not violated. This formulation and solution provides a means to solve the cross-schedule dependency problem when using crosslinking in the context of constellation planning.

TABLE 5

| Time Step | Sat A Memory | Sat B Memory |
|---|---|---|
| k1 | 80 GB | 200 GB |
| k2 | 130 GB | 150 GB |
| k3 | 180 GB | 100 GB |
| k4 | 180 GB | 100 GB |

Two-Layer Planning Approach

For larger planning problems, a bi-layer approach will provide significant computational efficiencies. In one embodiment, the first layer plans for downlinks while the second layer plans for imaging tasks. The downlink layer of the communication graph 201 is now discussed for the two-layer planning approach.

The embodiments improve balancing downlinking with image collection and/or data collection. The problems are actually inseparable as the amount of downlinking needed is directly dependent upon the amount of data acquired, and the amount of data to acquire should not exceed the amount that can be downlinked. Heuristics on the amount of data that could be acquired are used to determine when to downlink. The heuristics are discussed in detail hereafter. In one embodiment, the optimization problem can be defined as $$\min_{x_i} \sum_{k \in S_{dl}} (\tilde{c}_i x_i + \alpha d_i y_i) \quad \text{Equation 3}$$

$$\text{s.t.} \quad x_i \in \{0,1\}$$
$$y_i \in \mathbb{R}$$
$$y_i \geq 0$$
$$\vdots$$
$$y_i \geq y_{i-1} - \tilde{a}_i x_i + \tilde{b}_i$$

where ⋮ defines constraints respecting slew agility, visiting the ground station periodically, and performing consecutive downlinks when possible. The terms in the objective are now discussed:

$\sum_{i \in S_{dl}}$: The optimization is done for purely the downlink nodes $\tilde{c}_i x_i$: The opportunity cost of selecting the $i^{th}$ downlink node $ad_i y_i$: Penalty on the data at node i The final constraint describes the data as a function of the previous communication graph node 231 and the choice of whether or not to collect data at the current communication graph node 231. The $\tilde{a}_i$ is somewhat more complicated than at face value. To describe the full meaning of $\tilde{a}_i$, the data at time i can be written in two cases:

$$y_i = \begin{cases} y_{i-1} - \tilde{a}_i & x_i = 1 \\ y_{i-1} - \tilde{b}_i & x_i = 0 \end{cases}, \tilde{a}_i \geq 0, \tilde{b}_i \geq 0.$$

In words, $y_i$ decreases by $\tilde{a}_i$ if node i 231 is chosen and increases by $\tilde{b}_i$ if node i is not chosen. Since $x_i$ is binary, the data could be written as $$y_i = y_{i-1} + (1-x_i)\tilde{b}_i - \tilde{a}_i x_i,$$

which, factoring out $x_i$, can be expressed as $$y_i = y_{i-1} - (\tilde{b}_i + \tilde{a}_i)x_i + \tilde{b}_i.$$

Thus, $\tilde{a}_i = \tilde{b}_i + \tilde{a}_i$. So, $\tilde{a}_i$ is actually the sum of the data that could be obtained if node i 231 was not chosen and the data that would be downlinked if it were chosen. $\tilde{b}_i$ is the data that could be obtained if node i were not chosen.

In certain embodiments, the opportunities are sorted in terms of time (i.e., $x_1$ occurs at a time less than or equal to $x_2$). In addition, the formulation may be formulated for a single agent as $y_i$ for one agent should not be related to the value of another agent, i.e., one cannot simply order the $y_i$ in time and relate $y_i$ to $y_{i-1}$. In addition, an inequality may be used to express $y_i$ instead of an equality. The amount of data onboard is penalized, which forces the equality satisfaction at the optimal value if the data is positive. This also allows the visiting of a downlink communication graph node 231 to utilize only a portion of the downlink capability. If there is less data onboard than could be downlinked, then the $y_i \geq 0$ constraint combined with the inequality constraint will keep the data at or above a zero threshold.

Generation of the Heuristics

The values for $\tilde{c}_i$, $\tilde{a}_i$, and $\tilde{b}_i$ may not be known. "Heuristic" values (i.e., a "good guess") are determined for each of the values. The heuristics are generated using a dynamic programming approach to determine the amount of data that could be accessed over time. The dynamic programming provides values for the opportunity cost, $\tilde{c}_i$, and the amount of data that could be acquired at each node, $\tilde{b}_i$.

The value of $\tilde{a}_i$ is not well defined as it requires knowledge of amount of data downlinked at communication graph node i 231. However, each communication graph node 231 corresponds to a point in time; there is not a notion of duration. In one embodiment, communication graph nodes 231 may be chosen in sequence. In this respect, the data downloaded during the three consecutive nodes could be divided by three to define the data downloaded for a single node.

Graph-Centric Network Flow Approach

Figure 3E:
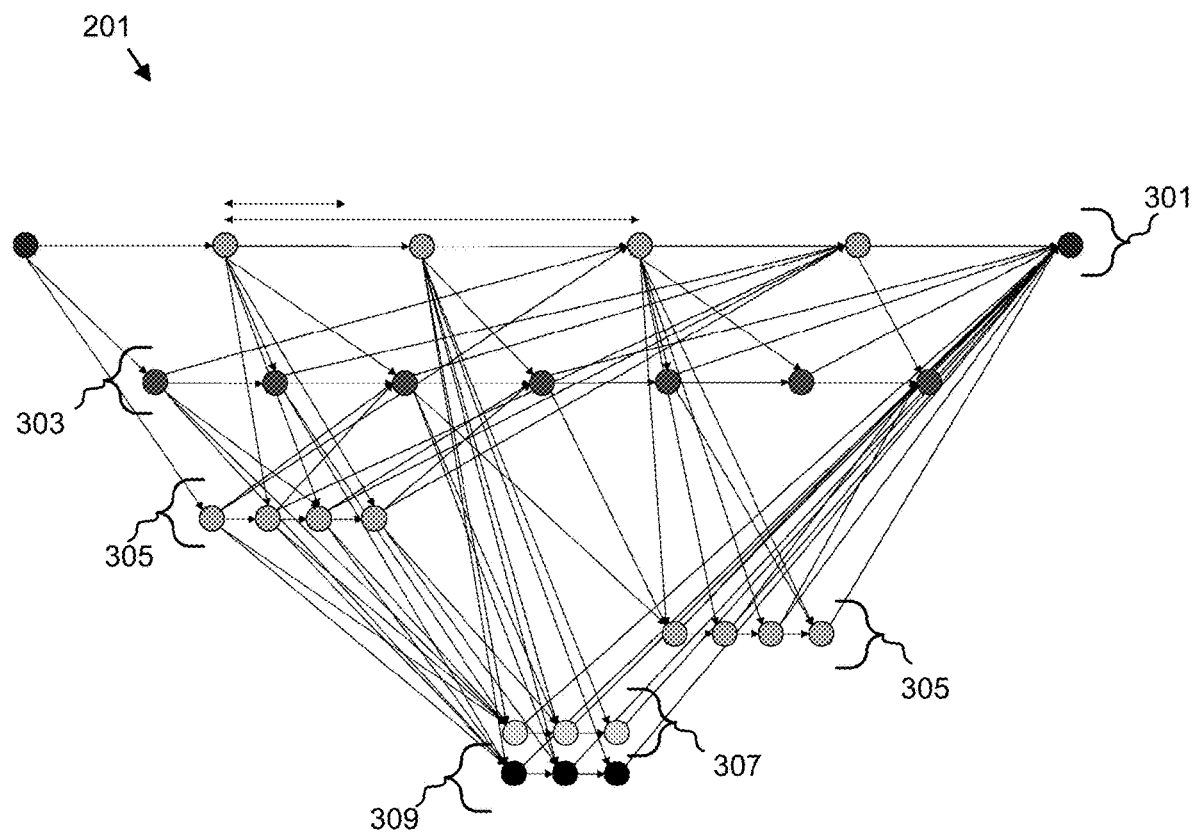
FIG. 3E is a graph for a communication graph for an embodiment of the two-layer network flow formulation

FIG. 3E is a graph for the communication graph 201 for an embodiment of the two-layer network flow formulation in the communication graph 201. In one embodiment, the communication graph nodes 231 comprise at least one backbone node 301 that represents the at least one satellite 101 not performing another task 207, at least one data collection node 303 that represents the at least one satellite 101 collecting data, at least one downlink node 305 that represents the at least one satellite 101 downlinking data to a ground station 103, at least one crosslink send node 307 that represents the at least one satellite 101 communicating data to another satellite 101, and at least one crosslink receive node 309 that represents the at least one satellite 101 communicating data to another satellite 101.

The first graph-centric approach for crosslink and downlink planning is formulated by combining the network flow approach with the crosslink formulation described above. The constraints are equivalent, but the graph formulation is different. An exemplary graph is depicted in FIG. 3E.

There may be five different types of communication graph nodes 231. Backbone nodes 301 correspond to the satellite 101 not performing another task and are used generally for maintaining connectivity in the graph. Graph edges 241 are represented as lines between nodes 231 and for clarity are not labeled. Edges 241 between subsequent backbone nodes 301 will have zero utility and zero data acquired.

Data collection nodes 303 correspond to the satellite collecting data. Communication graph edges 241 between subsequent data collection nodes 303 may have positive utility and positive data acquired.

Downlink nodes 305 correspond to the satellite downlinking data to a ground station 103. The downlink nodes 305 will have positive utility and negative data acquired.

Crosslink send nodes 307 correspond to the satellite 101 communicating data to another satellite 101. The crosslink send nodes 307 will have non-positive utility and a negative data acquired.

Crosslink receive nodes 309 correspond to the satellite 101 receiving data from another satellite 101. The crosslink receive nodes 309 will have non-positive utility and a positive data acquired.

There are two different types of communication graph edges 241. First are homogeneous communication graph edges 231. These edges 241 transition between two nodes 231 of the same type. The edge utility and data acquired are described with the communication graph nodes 231. There may be a line graph of homogeneous communication graph nodes 231 for each group of subsequent communication graph nodes 231 of the same type (i.e., communication graph edges 231 will not "skip over" communication graph nodes 241). The second type of communication graph edges 241 are transition communication graph edges 241. These communication graph edges 241 transition between communication graph nodes 231 of different types. The communication graph edges 241 correspond to the satellite 101 shifting activities, e.g., transition from the backbone node 301 to a downlink communication graph node 231. These edges 241 can be further divided into transitions to/from backbone node 301 and transitions between the remaining communication graph node types.

Transition to/from Backbone Nodes

Backbone nodes 301 are spaced evenly throughout the planning window of a communication graph 201. The transitions among backbone nodes 301 form a line graph from beginning to end. A communication graph node 231 that is not a backbone node 301 connects to the first backbone node 301 that is after a maximum slew time, $t_{slew,max}$, corresponding to the time it takes to slew a given number of degrees. Note that a slew between any two communication graph nodes 231 will be less than 180°. The backbone nodes 301 provide a worst-case scenario, allowing communication graph edges 241 with time length longer than $t_{slew,max}$ to be ignored. To provide connectivity, the backbone node 301 is connected to the subsequent backbone node 301 as well as every other communication graph nodes 231 with a time value between the backbone node 301 in question and the following backbone node 301 for the satellite 101.

Transition Between Non-Backbone Nodes

Other communication graph nodes 231 may fall at any arbitrary time throughout the planning window. A transition between two communication graph nodes 231 of different types is present if the second communication graph node 231 is at least a given amount of time after the first communication graph node 231, upper bounded by $t_{slew,max}$, and the second communication graph node 231 is the next communication graph node 231 of its type with a time greater than or equal to the first communication graph node 231. The reason for the upper bound is that the first communication graph node 231 can indirectly connect to any communication graph node 231 further than $t_{slew,max}$ using backbone communication graph nodes 231.

The structure of the communication graph 201 of FIG. 3E is less complex than the full graph of FIGS. 3A-E. By only considering transitions between communication graph nodes 231 within a window of time (as opposed to considering transitions from a communication graph node 231 to all following communication graph nodes 231), less transitions are added to the communication graph 201. Furthermore, backbone nodes 301 and data collection nodes 303 are spaced out in the planning window, reducing the number of communication graph nodes 231 (and thus resulting transitions) in a time window. The drawback of this less complex communication graph 201 is that some possible paths are sacrificed. For example, if communication graph nodes 231 of different types are close together, no transition is considered, even if slew constraints would have allowed one. This trade-off is acceptable as a rapid, heuristic communication plan 201 is what is desired from this stage.

Another advantage of this formulation is the ability to create a visit constraint on the downlink nodes 305 and crosslink nodes 307/309. To avoid oscillating between communication links and data collections, it may be desirable to have satellites 101 crosslink at most one time per crosslink opportunity and be limited in the number of times the satellites 101 can downlink in a downlink opportunity.

Assume that $n_{g-v}$ is the number of groups with visit constraints. Allow $\mathcal{J}_i^{g-v}$ be the index set corresponding to incoming edges for the $i^{th}$ group. Assume that group i should be visited a maximum of $n_i^v$ times with $$n^v = \begin{bmatrix} n_1^v \\ \vdots \\ n_{n_{g-v}}^v \end{bmatrix}.$$

The constraint matrix can be defined as $$A^{g-v} = [a_{ij}^{g-v}] = \begin{cases} 1 & j \in \mathcal{J}_i^{g-v} \\ 0 & \text{otherwise} \end{cases},$$

with the constraint defined as $A^{g-v}x \leq n^v$. The full optimization problem becomes Equation 4:

$$\max_z u^T z \qquad \text{Equation 4}$$
$$\text{s.t. } Dx = b, \, A_{data}y = b_{data}$$
$$A^{g-cl}x = 0, \, A^{g-v}x \leq n^v$$
$$x_i \in \{0, 1\}$$

Note the absence of $A_g x \leq 1_{n_g}$. Since the actual tasks 207 have been abstracted, there is no need to ensure that no two satellites 101 perform the same task 207. That will be addressed hereafter.

Selection of Imaging Tasks—The Target Layer

The embodiments outlined in the previous sections for the communications layer will yield a communication plan 203 for each satellite 101, providing times for downlinking and/or crosslinking. The target layer's purpose is to acquire imagery data from potential POIs, providing data to communicate. A communication graph 201 of FIG. 3E may be generated. There are two significant differences. The first is that the communication graph nodes 231 (downlink and crosslink) are only added where they occur in the communication plan 203. The second difference is that communication graph edges 241 are pruned around the communication graph nodes 231, forcing the embodiments to find a path through the communication graph nodes 231. A "dummy" communication graph node 231 may added to the end of every communication graph 201 to allow for paths that do not downlink or crosslink as much data as the communication plan 203 specified.

The communication graph nodes 231 between communication graph edges 241 in the communication graph 201 are generated in two steps. The first step determines what communication graph edges 241 may potentially be valid, and the second step checks that the slew rate allows that communication graph edges 241. The potentially valid communication graph edges 241 between targets are defined as any communication graph edge 241 between a communication graph node 231 and a later communication graph node 231, as long as there is not a backbone node 301 or a communication graph node 231 between them. There is a potential edge from every target node and the backbone node 301 or a communication graph node 231 following it. Every backbone node 301 connects to all of the target communication graph nodes 231 that are between it and the next backbone node 301 or a communication graph node 231, as well as the next backbone node 301 or a communication graph node 231. Additionally, each communication graph node 231 connects to the "dummy" communication graph node 231 in its window. Each "dummy" communication graph node 231 connects to all of the targets between itself and the next backbone node 301 or a communication graph node 231, including the next backbone node 301 or a communication graph node 231. Each of these potential communication graph edges 241 is then checked for slew feasibility before being added to the communication graph 201.

This results in a communication graph 201 that alternates between regions of relatively dense communication graph edges 241 and regions of sparse communication graph edges 241. The dense regions occur between communication windows where the embodiments must select the imaging tasks 107. The sparse regions occur during communication windows where the only communication graph edges 241 that occur are between communication graph nodes 231 and backbone communication graph nodes 231.

Figure 4:
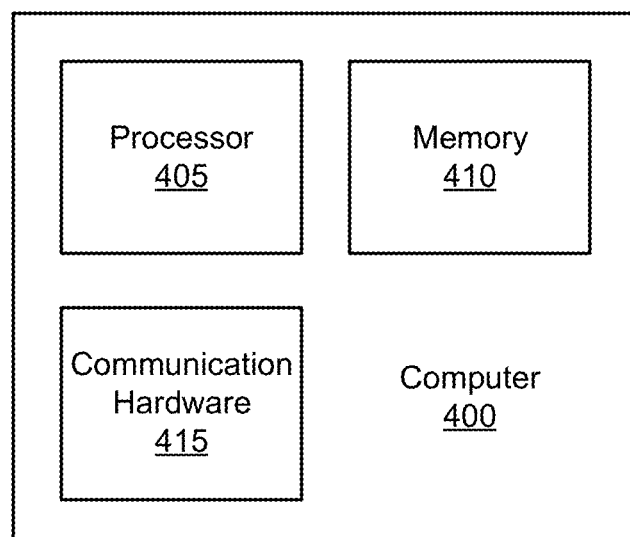
FIG. 4 is a schematic block diagram illustrating one embodiment of a computer.

FIG. 4 is a schematic block diagram illustrating one embodiment of a computer 400. The computer 400 may be embodied in a control facility, a ground station 103, and/or one or more satellites 101. In the depicted embodiment, the computer 400 includes a processor 405, a memory 410, and communication hardware 415. The memory 410 may store code and date. The processor 405 may execute the code and process the data. The communication hardware 415 may communication with other devices.

Figure 5:
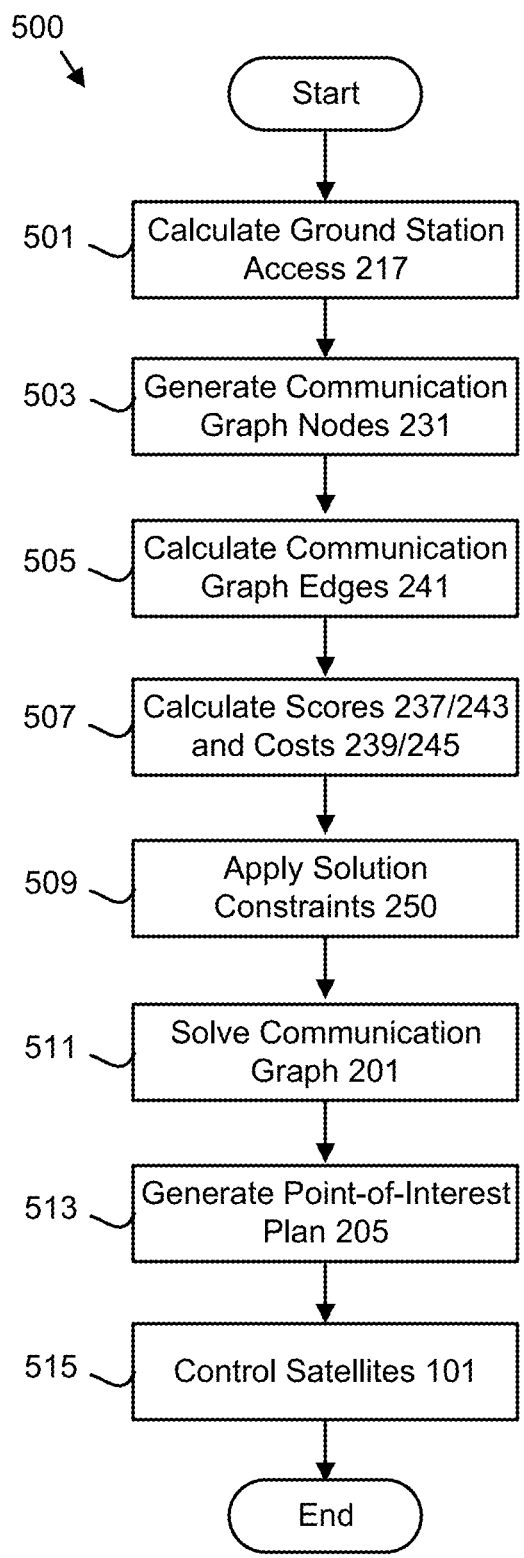
FIG. 5 is a schematic flow chart diagram illustrating one embodiment of a satellite scheduling method.

FIG. 5 is a schematic flow chart diagram illustrating one embodiment of a satellite scheduling method 500. The method 500 may generate the point of interest plan 205 and control the satellite constellation 100 and/or one or more satellites 101. The method 500 may be performed by the computer 400 and/or processor 405.

The method 500 starts and in one embodiment, the processor 405 calculates 501 the ground station access 217 for at least one satellite 101 of the satellite constellation 100. The processor 405 may generate 503 the communication graph nodes 231 for the at least one satellite 101. The communication graph nodes 231 may be for a one-layer or a two-layer communication graph 201. In addition, the processor 405 may calculate 505 communication graph edges 241 from the communication graph nodes 231 for the communication graph 201. The communication graph nodes 231 and the communication graph edges 241 may comprise the communication graph 201.

The processor 405 may calculate 507 the node costs 237 and node scores 239 for the communication graph nodes 231. In addition, the processor 405 may calculate 507 the edge scores 243 and edge costs 245. The processor 405 may apply 509 the solution constraints 250 to the communication graph 201.

The processor 405 solves 511 the communication graph 201. The processor 405 may solve 511 the communication graph 201 to yield the communication plan 203. The communication graph 201 may be solved as shown in FIGS. 3A-E. In addition, the processor 405 may generate 513 the points-of-interest plan 205 from the communication plan 203. The point-of-interest plan 205 may be generated 513 by applying the visit group constraint 255 and/or linear constraint 257 to the communication plan 203. The point-of-interest plan 205 may modify the satellite position 234 and/or desired orientation 238.

In one embodiment, the processor 405 controls 515 the at least one satellite 101 based on the points-of-interest plan 205. The satellite position 234 and/or desired orientation 238 may be controlled 515.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating communication graph nodes for at least one satellite wherein a node score is assigned to each communication graph node, the communication graph nodes comprise backbone nodes that represent the at least one satellite not performing a task and connect to every target communication graph node with a time value between a given backbone node and a subsequent backbone node;
calculating communication graph edges from the communication graph nodes for the at least one satellite, wherein the communication graph nodes and the communication graph edges comprise a communication graph;
calculating node scores for each communication graph edge by assigning the node scores of each communication graph node to a corresponding communication graph edge that connects to the communication graph node as edge scores and edge costs, wherein the edge scores describe a benefit associated with the corresponding communication graph node and the edge costs represent a transition between communication graph nodes based on a slew performed, a vector x of all edge flows $x_i$ that represents flow along a given edge $e_i$ for an optimization variable i, and a memory vector y of all memory needs $y_{lk}$ for the at least one satellite at given times k;
solving the communication graph to minimize slewing the at least one satellite and prevent each element of the memory vector from exceeding a maximum memory capacity by maximizing the utility $u^T z$ subject to $Dx=b$, $A_g x \le 1_{n_g}$, $A_{data} z = b_{gdata}$, $x_i \in \{0, 1\} \forall i$, $0 \le y_{l,k} \le y_{l,max}$ $\forall$ l,k, and $z=[x^T y^T]^T$ to yield a communication plan, wherein u is the utility of all utility $u_i$ associated with the optimization variable i, D is an incidence matrix, b is a right-angle hypotenuse-side congruence of a flow constant, $A_g$ is a group constraint matrix, $b_{gdata}$ is a right-angle hypotenuse-side congruence of a group constraint, l is a given satellite, and z is all optimization parameters;
generating a points-of-interest plan from the communication plan; and
controlling the at least one satellite based on the points-of-interest plan by slewing the at least one satellite between orientations for each communication graph node.

2. The method of claim 1, wherein the communication graph nodes comprise a data collection node that represents the at least one satellite collecting data, a downlink node that represents the at least one satellite downlinking data to a ground station, a crosslink send node that represents the at least one satellite communicating data to another satellite, and a crosslink receive node that represents the at least one satellite communicating data to another satellite.

3. The method of claim 1, wherein the method further comprises:
calculating ground station access for the at least one satellite.

4. The method of claim 1, wherein the communication graph is a directed acyclic graph (DAG).

5. An apparatus comprising:
a processor executing code stored in a memory to perform:
generating communication graph nodes for at least one satellite wherein a node score is assigned to each communication graph node, the communication graph nodes comprise backbone nodes that represent the at least one satellite not performing a task and connect to every target communication graph node with a time value between a given backbone node and a subsequent backbone node;
calculating communication graph edges from the communication graph nodes for the at least one satellite, wherein the communication graph nodes and the communication graph edges comprise a communication graph;
calculating node scores for each communication graph edge by assigning the node scores of each communication graph node to a corresponding communication graph edge that connects to the communication graph node as edge scores and edge costs, wherein the edge scores describe a benefit associated with the corresponding communication graph node and the edge costs represent a transition between communication graph nodes based on a slew performed, a vector x of all edge flows $x_i$ that represents flow along a given edge $e_i$ for an optimization variable i, and a memory vector y of all memory needs $y_{lk}$ for the at least one satellite at given times k;
solving the communication graph to minimize slewing the at least one satellite and prevent each element of the memory vector from exceeding a maximum memory capacity by maximizing the utility $u^T z$ subject to $Dx=b$, $A_g x \le 1_{n_g}$, $A_{data} z = b_{gdata}$, $x_i \in \{0, 1\} \forall i$, $0 \le y_{l,k} \le y_{l,max}$ $\forall$ l,k, and $z=[x^T y^T]^T$ to yield a communication plan, wherein u is the utility of all utility $u_i$ associated with the optimization variable i, D is an incidence matrix, b is a right-angle hypotenuse-side congruence of a flow constant, $A_g$ is a group constraint matrix, $b_{gdata}$ is a right-angle hypotenuse-side congruence of a group constraint, l is a given satellite, and z is all optimization parameters;

generating a points-of-interest plan from the communication plan; and controlling the at least one satellite based on the points-of-interest plan by slewing the at least one satellite between orientations for each communication graph node.

6. The apparatus of claim 5, wherein the communication graph nodes comprise a data collection node that represents the at least one satellite collecting data, a downlink node that represents the at least one satellite downlinking data to a ground station, a crosslink send node that represents the at least one satellite communicating data to another satellite, and a crosslink receive node that represents the at least one satellite communicating data to another satellite.

7. The apparatus of claim 5, wherein the processor further performs calculating ground station access for the at least one satellite.

8. The apparatus of claim 5, wherein the communication graph is a directed acyclic graph (DAG).

9. A program product comprising a non-transitory storage medium storing code executable by a processor to perform:

generating communication graph nodes for at least one satellite wherein a node score is assigned to each communication graph node, the communication graph nodes comprise backbone nodes that represent the at least one satellite not performing a task and connect to every target communication graph node with a time value between a given backbone node and a subsequent backbone node;

calculating communication graph edges from the communication graph nodes for the at least one satellite, wherein the communication graph nodes and the communication graph edges comprise a communication graph;

calculating node scores for each communication graph edge by assigning the node scores of each communication graph node to a corresponding communication graph edge that connects to the communication graph node as edge scores and edge costs, wherein the edge scores describe a benefit associated with the corresponding communication graph node and the edge costs represent a transition between communication graph nodes based on a slew performed, a vector x of all edge flows $x_i$ that represents flow along a given edge $e_i$ for an optimization variable i, and a memory vector y of all memory needs $y_{lk}$ for the at least one satellite at given times k;

solving the communication graph to minimize slewing the at least one satellite and prevent each element of the memory vector from exceeding a maximum memory capacity by maximizing the utility $u^T z$ subject to $Dx=b$, $A_g x \leq 1_{n_g}$, $A_{data} z = b_{gdata}$, $x_i \in \{0, 1\} \forall i$, $0 \leq y_{l,k} \leq y_{l,max}$ $\forall l,k$, and $z=[x^T y^T]^T$ to yield a communication plan, wherein u is the utility of all utility $u_i$ associated with the optimization variable i, D is an incidence matrix, b is a right-angle hypotenuse-side congruence of a flow constant, $A_g$ is a group constraint matrix, $b_{gdata}$ is a right-angle hypotenuse-side congruence of a group constraint, l is a given satellite, and z is all optimization parameters;

generating a points-of-interest plan from the communication plan; and controlling the at least one satellite based on the points-of-interest plan by slewing the at least one satellite between orientations for each communication graph node.

10. The program product of claim 9, wherein the communication graph nodes comprise a data collection node that represents the at least one satellite collecting data, a downlink node that represents the at least one satellite downlinking data to a ground station, a crosslink send node that represents the at least one satellite communicating data to another satellite, and a crosslink receive node that represents the at least one satellite communicating data to another satellite.

11. The program product of claim 9, wherein the processor further performs calculating ground station access for the at least one satellite.

12. The program product of claim 9, wherein the communication graph is a directed acyclic graph (DAG).

13. The method of claim 1, wherein each communication graph node comprises an on-board memory status for each time step of the communication graph and the communication plan does not exceed a maximum memory capacity at any communication graph node.

14. The apparatus of claim 5, wherein each communication graph node comprises an on-board memory status for each time step of the communication graph and the communication plan does not exceed a maximum memory capacity at any communication graph node.

15. The program product of claim 9, wherein each communication graph node comprises an on-board memory status for each time step of the communication graph and the communication plan does not exceed a maximum memory capacity at any communication graph node.

* * * * *